United States Patent
Hsieh et al.

(10) Patent No.: US 7,688,131 B2
(45) Date of Patent: Mar. 30, 2010

(54) CHARGE PUMP CIRCUIT

(75) Inventors: Chih-Yuan Hsieh, Hsinchu (TW);
Chih-Jen Yen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 12/204,791

(22) Filed: Sep. 4, 2008

(65) Prior Publication Data

US 2009/0174466 A1    Jul. 9, 2009

(30) Foreign Application Priority Data

Jan. 8, 2008    (TW) .............................. 97100661 A (51) Int. Cl.
*G05F 1/10* (2006.01)
(52) U.S. Cl. ...................... 327/536; 327/534
(58) Field of Classification Search .................. None
See application file for complete search history.

(56) References Cited

U.S. PATENT DOCUMENTS

| 5,262,934 | A | * | 11/1993 | Price | 363/60 |
|---|---|---|---|---|---|
| 2005/0040882 | A1 | * | 2/2005 | Geen | 327/536 |
| 2006/0051414 | A1 | * | 3/2006 | Ramalho et al. | 424/464 |
| 2006/0244513 | A1 | * | 11/2006 | Yen et al. | 327/536 |
| 2007/0001745 | A1 | * | 1/2007 | Yen | 327/536 |
| 2008/0079479 | A1 | * | 4/2008 | Olsen | 327/536 |
| 2008/0231347 | A1 | * | 9/2008 | Yen et al. | 327/536 |

* cited by examiner

*Primary Examiner*—Tuan Lam
(74) *Attorney, Agent, or Firm*—Jianq Chyun IP Office (57) ABSTRACT

A charge pump circuit is provided. The charge pump circuit includes a pump unit, first through sixth switches, a fly capacitor and an output capacitor. In a first period, an input voltage and a first voltage charge at least one internal capacitor of the pump unit via a first terminal and a second terminal of the pump unit. In the second period, the internal capacitor of the pump unit provides charges to the fly capacitor via the second switch and generates a first output voltage. In the third period, the fly capacitor supplies the charges to the output capacitor via the fourth switch to generate a second output voltage.

14 Claims, 9 Drawing Sheets

CHARGE PUMP CIRCUIT

CROSS-REFERENCE TO RELATED APPLICATION

This application claims the priority benefit of Taiwan application serial no. 97100661, filed on Jan. 8, 2008. The entirety of the above-mentioned patent application is hereby incorporated by reference herein and made a part of this specification.

BACKGROUND OF THE INVENTION

1. Field of the Invention

The present invention generally relates to a charge pump circuit, and more particularly, to a charge pump circuit having comparatively fewer capacitor components.

2. Description of Related Art

Typically, in an electronic circuit, voltages of different levels are often needed for operation of the circuit. Therefore, a charge pump is often employed in such an electronic circuit for generating voltages of different level.

Figure 1:
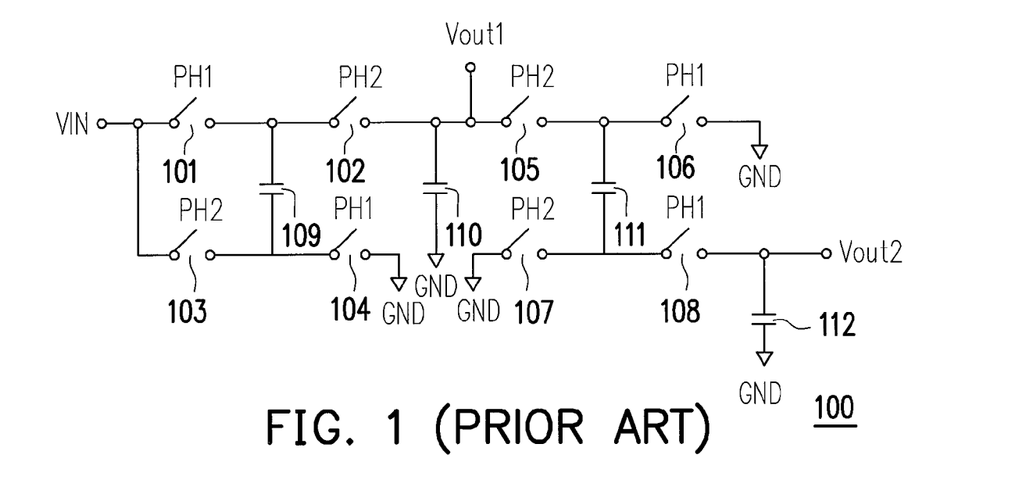
FIG. 1 is a circuit diagram of a conventional charge pump.
Figure 2A:
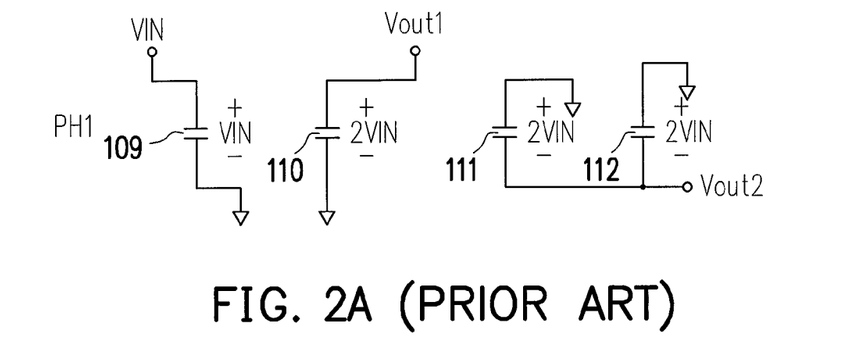
FIGS. 2A and 2B are equivalent circuits of the charge pump circuit shown in FIG. 1 during a first period and a second period, respectively.
Figure 2B:
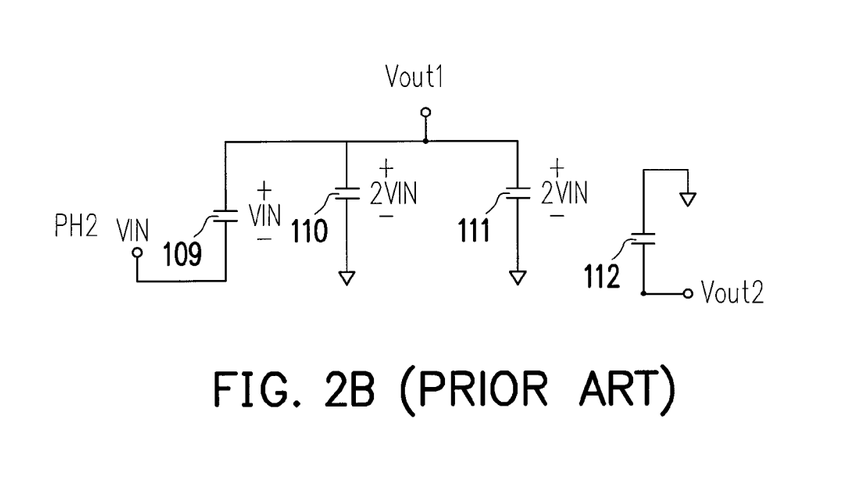

FIG. 1 is a circuit diagram of a conventional charge pump. Referring to FIG. 1, there is shown a charge pump circuit 100 including switches 101 through 108, capacitors 109 through 112. The charge pump circuit 100 utilizes two control signals PH1 (in first periods) and PH2 (in second periods) for alternately controlling on/off states of the switches 101 through 108. When the control signal PH1 is at a high level, the switches 101, 104, 106 and 108 are turned on, in which an equivalent circuit is as shown in FIG. 2A. In this case, an input voltage VIN charges the capacitor 109 to hold a voltage difference at two terminals thereof that equals to VIN. When the control signal PH2 is at a high level, the switches 102, 103, 105, and 107 are turned on, in which an equivalent circuit is as shown in FIG. 2B. In this case, the input voltage VIN and charges stored in the capacitor 109 charge the capacitors 110 and 111 to 2VIN, and generate an output voltage Vout1 with a level of 2VIN.

Then, when the control signal PH1 is again shifted to the high level, in which the capacitor 110 stores charges of 2VIN, the output voltage Vou1 is sustained as 2VIN. Meanwhile, the capacitor 112 is charged by charges stored in the capacitor 111, so as to generate another output voltage Vout2 with a level of −2VIN.

Figure 3:
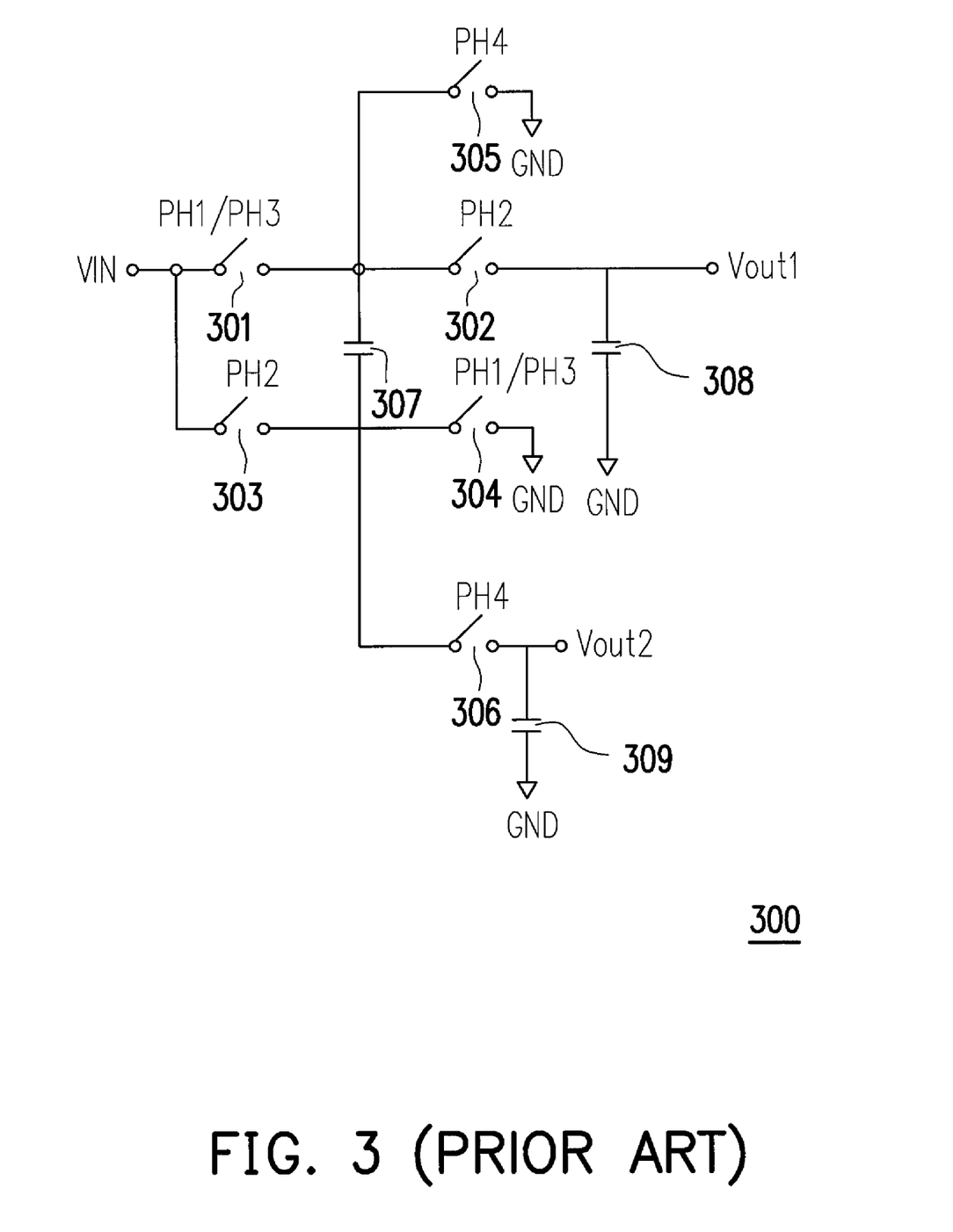
FIG. 3 is a circuit diagram of another conventional charge pump.
Figure 4A:
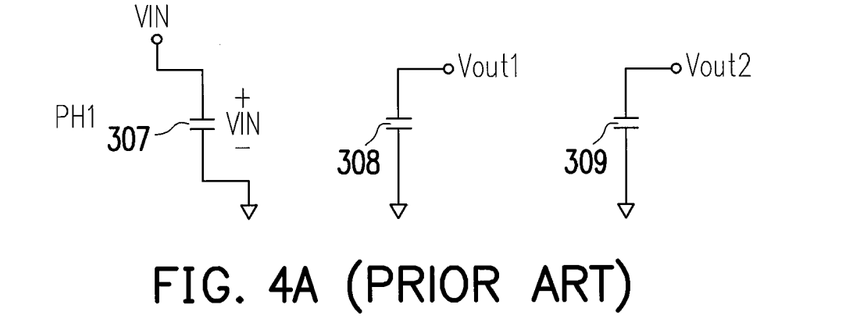
FIGS. 4A through 4D are equivalent circuits of the charge pump circuit shown in FIG. 3 during a first period through a fourth period, respectively.
Figure 4B:
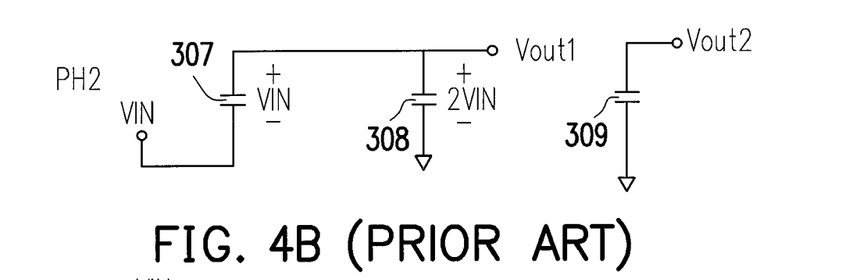

FIG. 3 is a circuit diagram of another conventional charge pump. Referring to FIG. 3, there is shown a charge pump circuit 300 including switches 301 through 306, capacitors 307 through 309. The charge pump circuit 300 utilizes four control signals PH1 (in first periods) through PH4 (in fourth periods) for alternately controlling on/off states of the switches 301 through 306. When the control signal PH1 is at a high level, the switches 301 and 304 are turned on, in which the charge pump circuit 300 has an equivalent circuit as shown in FIG. 4A. In this case, an input voltage VIN charges the capacitor 307 to hold a voltage difference between two terminals thereof identical to VIN. When the control signal PH2 is at the high level, the switches 302, and 303 are turned on, in which the charge pump circuit 300 has an equivalent circuit as shown in FIG. 4B. The capacitor 307 has a terminal coupled to the input voltage VIN. The capacitor 308 is charged to 2VIN by the input voltage VIN and charges stored in the capacitor 307, and thus outputting an output voltage Vout1 with a voltage level of 2VIN.

Figure 4C:
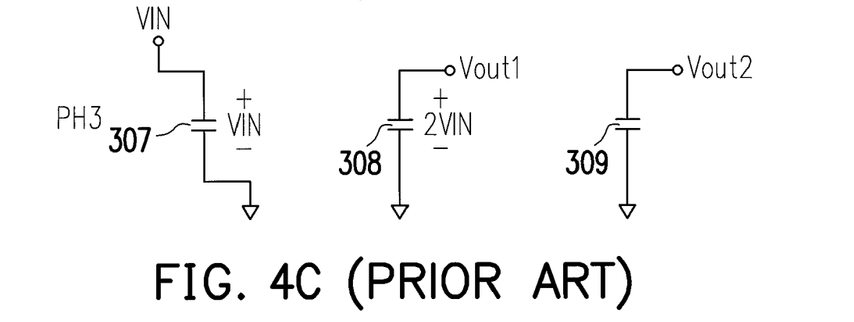
Figure 4D:
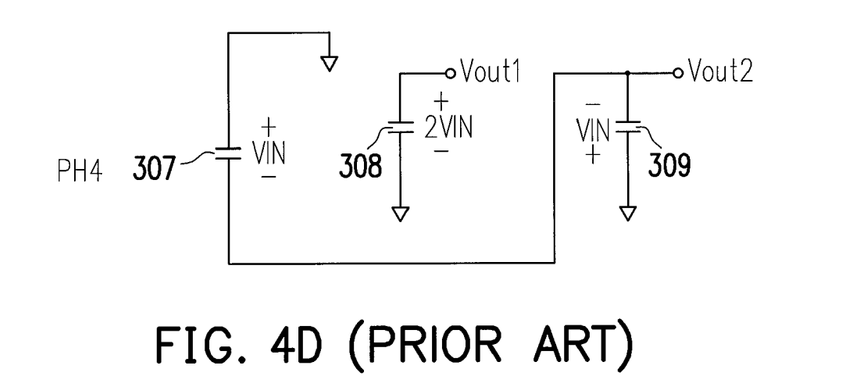

When the control signal PH3 is at a high level, the switches 301 and 304 are turned on, in which the charge pump circuit 300 has an equivalent circuit as shown in FIG. 4C. In this case, the capacitor 308 stores charges of 2VIN, and therefore the output voltage Vout1 sustains a voltage level of 2VIN. On the other hand, the input voltage VIN charges the capacitor 307 to hold a voltage difference between two terminals thereof that equals to VIN. When the control signal PH4 is at the high level, the switches 305 and 306 are turned on, in which the charge pump circuit 300 has an equivalent circuit as shown in FIG. 4D. In this case, the capacitor 309 is discharged by the charges stored in the capacitor 307, so as to generate another output voltage Vout2 with a voltage level of −VIN.

Generally, with respect to a charge pump circuit, built-in capacitors occupy a large area of the integrated circuit (IC), and thus the production cost is increased. On the other hand, external capacitors also occupy additional areas on the circuit board, and thereby increase the production cost, and even make the product bulky. Further, although the conventional charge pump circuit 100 is capable of outputting output voltages 2VIN and −2VIN. The output voltages Vout1, Vout2 both require a stabilization capacitor, which increases the production cost. Furthermore, although the conventional charge pump circuit 300 uses capacitors one less than the charge pump circuit 100, it produces a negative voltage of only −VIN. The conventional charge pump circuit 300 employs four control signals (correspondingly in four periods) for generating output voltages of 2VIN and −VIN, and therefore has a lower efficiency, and a lower maximum load capability.

SUMMARY OF THE INVENTION

Accordingly, the present invention is directed to a charge pump circuit for providing different output voltages, so as to reduce capacitors used therein and save a production cost thereof.

The present invention provides a charge pump circuit, which is adapted for generating a first output voltage and a second output voltage according to an input voltage. The charge pump circuit includes a pump unit, a first switch, a second switch, a third switch, a fourth switch, a fifth switch, a fly capacitor, and a six switch. The pump unit includes at least one internal capacitor, a first terminal, a second terminal, a third terminal, and a fourth terminal. The first terminal is coupled to the input voltage. The second terminal is coupled to a first voltage, so as to charge the internal capacitor with the input voltage and the first voltage during a first period, and allow the internal capacitor to provide a first output voltage to the fourth terminal during a second period and a third period in accordance with a voltage level of the third terminal.

The first switch includes a first terminal and a second terminal. The first terminal of the first switch is coupled to a second voltage, and the second terminal of the first switch is coupled to the third terminal of the pump unit. The first switch is maintained off during the first period, and maintained on during the second period and the third period. The second switch includes a first terminal and a second terminal. The first terminal of the second switch is coupled to the fourth terminal of the pump unit. The second switch is maintained off during the first period, and maintained on during the second period and the third period. The third switch includes a first terminal and a second terminal. The first terminal of the third switch is coupled to the second terminal of the second switch. The third switch is maintained on during the first period and the second period, and maintained off during the third period. The first terminal of the third switch is also coupled to the output terminal of the first output voltage. The fourth switch includes a first terminal and a second terminal. The first terminal of the fourth switch is coupled to a third voltage. The fourth switch is maintained on during the first period and the second period, and maintained off during the third period. The fifth switch includes a first terminal and a second terminal. The first terminal of the fifth switch is coupled to a fourth voltage. The fifth switch is maintained off during the first period and the second period, and maintained on during the third period.

The fly capacitor includes a first terminal and a second terminal. The first terminal of the fly capacitor is coupled to the second terminal of the third switch and the second switch of the fifth switch. The second terminal of the fly capacitor is coupled to the second terminal of the fourth switch. Further, the second terminal of the fly capacitor is coupled to the second terminal of the third voltage during the second period, for charging the fly capacitor with the first output voltage and the third voltage. During the third period, the fly capacitor provides the second output voltage to the second terminal of the fly capacitor in accordance with a voltage level of the fourth voltage. The second terminal of the fly capacitor is coupled to the third voltage, so as to provide the first output voltage to the first terminal of the fly capacitor during the first period in accordance with a voltage level of the third voltage. The sixth switch includes a first terminal and a second terminal. The first terminal of the sixth switch is coupled to the second terminal of the fly capacitor. The sixth switch is maintained off during the first period and the second period, and maintained on during the third period. The second terminal of the sixth switch is coupled to the output terminal of the second output voltage.

The present invention provides a charge pump circuit. The charge pump circuit includes a pump unit, a first switch, a second switch, a third switch, a fourth switch, a fly capacitor and a fifth switch. The pump unit includes an input terminal, and an output terminal. The input terminal of the pump unit receives an input voltage, and the output terminal of the pump unit provides a first output voltage. The first switch includes a first terminal and a second terminal. The first terminal of the first switch is coupled to the output terminal of the pump unit. The first switch is maintained off during the first period, and maintained on during the second period and the third period. The second terminal of the first switch is coupled to the output terminal of the first output voltage.

The second switch includes a first terminal and a second terminal. The second switch is maintained on during the first period and the second period, and maintained off during the third period. The third switch includes a first terminal and a second terminal. The first terminal of the third switch is coupled to a first voltage. The third switch is maintained on during the first period and the second period, and maintained off during the third period. The fourth switch includes a first terminal and a second terminal. The first terminal of the fourth switch is coupled to a second voltage. The fourth switch is maintained off during the first period and the second period, and maintained on during the third period.

The fly capacitor includes a first terminal and a second terminal. The first terminal of the fly capacitor is coupled to the second terminal of the second switch and the second switch of the fourth switch. The second terminal of the fly capacitor is coupled to the second terminal of the third switch. Further, the second terminal of the fly capacitor is coupled to the first voltage during the second period, for charging the fly capacitor with the first output voltage and the first voltage. During the third period, the fly capacitor provides the second output voltage to the second terminal of the fly capacitor in accordance with a voltage level of the second voltage. The second terminal of the fly capacitor is coupled to the first voltage during the first period, so as to allow the fly capacitor to provide the first output voltage in accordance with a voltage level of the first voltage. The fifth switch includes a first terminal and a second terminal. The first terminal of the fifth switch is coupled to the second terminal of the fly capacitor. The fifth switch is maintained off during the first period and the second period, and maintained on during the third period. The second terminal of the fifth switch is coupled to the output terminal of the second output voltage.

The present invention employs a fly capacitor for serving as a stabilization capacitor for performing output voltage function during different periods, and therefore the number of the stabilization capacitors used therein may be reduced. Furthermore, the present invention is adapted to generate a relative high output voltage when using less control signals. As such, the present invention is featured with a higher efficiency and a larger maximum load current.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

First Embodiment

Figure 5:
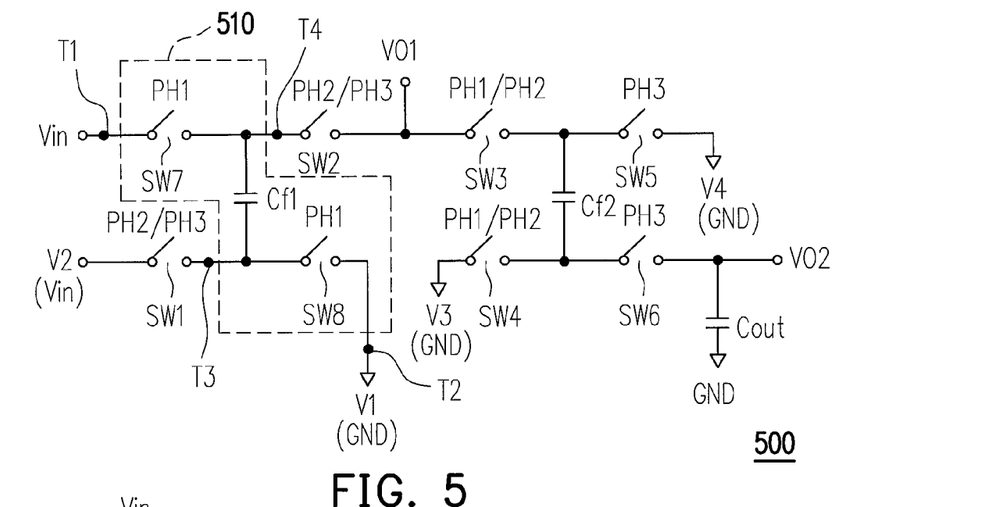
FIG. 5 is a circuit diagram of a charge pump according to a first embodiment of the present invention.

FIG. 5 is a circuit diagram of a charge pump according to a first embodiment of the present invention. Referring to FIG. 5, there is shown a charge pump circuit 500 including a first switch SW1, a second switch SW2, a third switch SW3, a fourth switch SW4, a fifth switch SW5, a sixth switch SW6, a fly capacitor Cf2, and an output capacitor Cout.

The pump unit 510 includes a first terminal T1, a second terminal T2, a third terminal T3, and a fourth terminal T4. The first terminal T1 of the pump unit 510 is coupled to an input voltage Vin, and the second terminal T2 of the pump unit 510 is coupled to a first voltage V1, i.e., a grounding voltage GND. The pump unit 510 further includes an internal capacitor Cf1, a seventh switch SW7, and an eighth switch SW8. The seventh switch SW7 includes a first terminal and a second terminal. The internal capacitor Cf1 includes a first terminal and a second terminal. The first terminal of the seventh switch SW7 is coupled to the first terminal T1 of the pump unit 510, and the second terminal of the seventh switch SW7 is coupled to the first terminal of the internal capacitor Cf1. The first terminal of the internal capacitor Cf1 also serves as the fourth terminal T4 of the pump unit 510. The eighth switch SW8 includes a first terminal and a second terminal. The first terminal of the eighth switch SW8 serves as the second terminal T2 of the pump unit 510. The second terminal of the eighth switch SW8 is coupled to the second terminal of the internal capacitor Cf1. The second terminal of the internal capacitor Cf1 serves as the third terminal T3 of the pump unit 510.

The first switch SW1 includes a first terminal and a second terminal. The first terminal of the first switch SW1 is coupled to a second voltage V2, e.g., an input voltage Vin. The second terminal of the first switch SW1 is coupled to the third terminal T3 of the pump unit 510. The second switch SW2 includes a first terminal and a second terminal. The first terminal of the second switch SW2 is coupled to the fourth terminal T4 of the pump unit 510. The third switch SW3 includes a first terminal and a second terminal. The first terminal of the third switch SW3 is coupled to the second terminal of the second switch SW2. The first terminal of the third switch SW3 is coupled to a first output voltage VO1. The fourth switch SW4 includes a first terminal and a second terminal. The first terminal of the fourth switch SW4 is coupled to a third voltage V3, e.g., a grounding voltage GND. The fifth switch SW5 includes a first terminal and a second terminal. The first terminal of the fifth switch SW5 is coupled to a fourth voltage V4, e.g., a grounding voltage GND.

The fly capacitor Cf2 includes a first terminal and a second terminal. The first terminal of the fly capacitor Cf2 is coupled to the second terminal of the third switch SW3 and the second terminal of the fifth switch SW5. The second terminal of the fly capacitor Cf2 is coupled to the second terminal of the fourth switch SW4. The sixth switch SW6 includes a first terminal and a second terminal. The first terminal of the sixth switch SW6 is coupled to the second terminal of the fly capacitor Cf2. The output capacitor Cout includes two terminals, one of which is coupled to the grounding terminal GND, and the other is coupled to the second terminal of the sixth switch SW6.

Figure 6A:
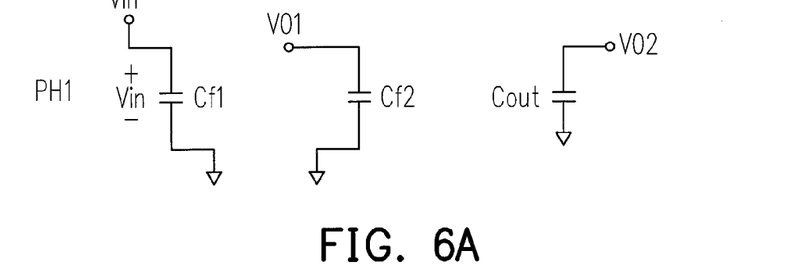
FIGS. 6A through 6C are equivalent circuits of the charge pump circuit shown in FIG. 5 during a first period through a third period, respectively.

The structure and interrelationship between components of the charge pump circuit 500 are discussed in brief above. And below, the operation of the charge pump circuit 500 will be further illustrated in more detail. First, when the charge pump circuit 500 enters a first period, a control signal PH1 is at a high level, and control signals PH2 and PH3 are at a low level. In this case, the third switch SW3, the fourth switch SW4, the seventh switch SW7, and the eighth switch SW8 are maintained on, while the first switch SW1, the second switch SW2, the fifth switch SW5, and the sixth switch SW6 are maintained off, in which an equivalent circuit of the charge pump circuit 500 is as shown in FIG. 6A. Meanwhile, the input voltage Vin and the first voltage V1, i.e., the grounding voltage GND, are respectively coupled to the two terminals of the internal capacitor Cf1 and charge the internal capacitor Cf1 thereby, until a voltage difference between the two terminals of the internal capacitor Cf1 equals to the input voltage Vin.

Figure 6B:
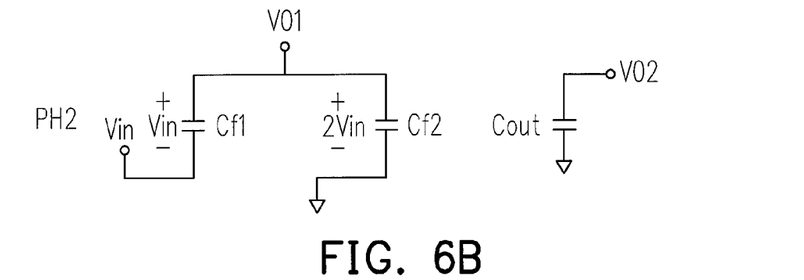

Then the charge pump circuit 500 enters the second period, in which the control signal PH2 is at the high level, and the control signals PH1 and PH3 are at the low level. In this case, the first switch SW1, the second switch SW2, the third switch SW3, and the fourth switch SW4 are maintained on, while the fifth switch SW5, the sixth switch SW6, the seventh switch SW7 and the eighth switch SW8 are maintained off, in which an equivalent circuit of the charge pump circuit 500 is shown in FIG. 6B. Meanwhile, the second terminal of the internal capacitor Cf1 is coupled to the second voltage V2, i.e., input voltage Vin, so that a voltage level at the first terminal of the internal capacitor Cf1 is raised from Vin to 2Vin. The internal capacitor Cf1 then charges the fly capacitor Cf2 to 2Vin and provides the first output voltage VO1 with a voltage level of 2Vin.

Figure 6C:
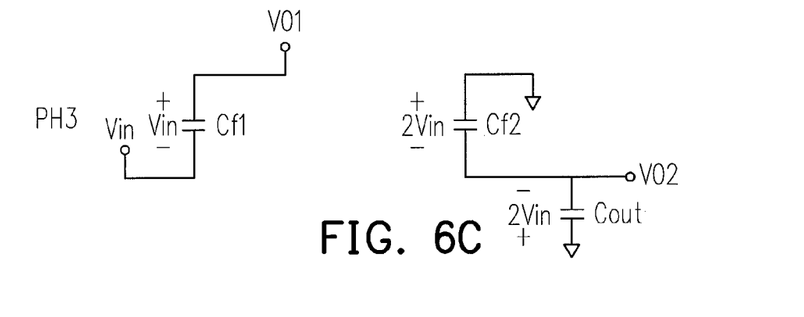

Then the charge pump circuit 500 enters the third period, in which the control signal PH3 is at the high level, and the control signals PH1 and PH2 are at the low level. In this case, the first switch SW1, the second switch SW2, the fifth switch SW5, and the sixth switch SW6 are maintained on, and the third switch SW3, the fourth switch SW4, the seventh switch SW7 and the eighth switch SW8 are maintained off, in which an equivalent circuit of the charge pump circuit 500 is as shown in FIG. 6C. Meanwhile, the first output voltage VO1 is maintained at the voltage level of 2Vin. On the other hand, the first terminal of the fly capacitor Cf2 is coupled to the fourth voltage V4, i.e., the grounding voltage GND, so as to discharge the output capacitor Cout by the charges stored in the fly capacitor Cf2, and thereby generate a second output voltage VO2 with a voltage level of −2Vin.

According to the first embodiment, the first voltage, the second voltage, the third voltage, and the fourth voltage can be set as voltages respectively with different voltage levels. The aforementioned first period, second period, and third period are used for identifying the sequence of turning on the switches, without restricting the practical order of processing. Further, first output voltage and second output voltage with other multiplying factors can also be provided according to the present invention, as illustrated in embodiments given below.

Second Embodiment

Figure 7:
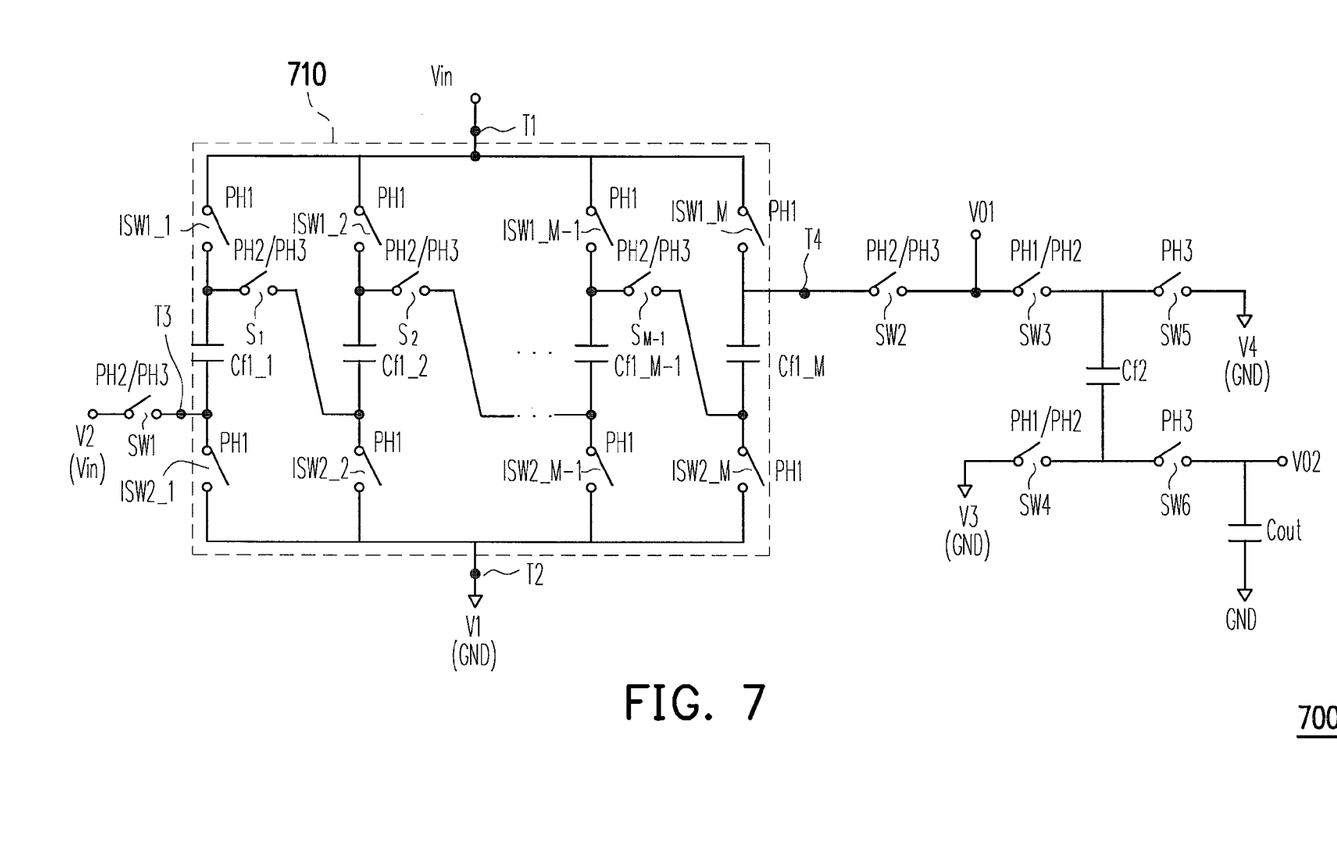
FIG. 7 is a circuit diagram of a charge pump according to a second embodiment of the present invention.

FIG. 7 is a circuit diagram of a charge pump according to a second embodiment of the present invention. Referring to FIG. 7, there is shown a charge pump circuit 700. The charge pump circuit 700 includes a pump unit 710, a first switch SW1, a second switch SW2, a third switch SW3, a fourth switch SW4, a fifth switch SW5, a sixth switch SW6, a fly capacitor Cf2, and an output capacitor Cout.

The first switch SW1 includes a first terminal and a second terminal. The first terminal of the first switch SW1 is coupled to a second voltage V2, e.g., an input voltage Vin. The second terminal of the first switch SW1 is coupled to the third terminal T3 of the pump unit 710. The second switch SW2 includes a first terminal and a second terminal. The first terminal of the second switch SW2 is coupled to the fourth terminal T4 of the pump unit 710. The third switch SW3 includes a first terminal and a second terminal. The first terminal of the third switch SW3 is coupled to the second terminal of the second switch SW2. The first terminal of the third switch SW3 is also coupled to an output terminal of a first output voltage VO1. The fourth switch SW4 includes a first terminal and a second terminal. The first terminal of the fourth switch SW4 is coupled to a third voltage V3, e.g., a grounding voltage GND. The fifth switch SW5 includes a first terminal and a second terminal. The first terminal of the fifth switch SW5 is coupled to a fourth voltage V4, e.g., a grounding voltage GND.

The fly capacitor Cf2 includes a first terminal and a second terminal. The first terminal of the fly capacitor Cf2 is coupled to the second terminal of the third switch SW3 and the second terminal of the fifth switch SW5. The second terminal of the fly capacitor Cf2 is coupled to the second terminal of the fourth switch SW4. The sixth switch SW6 includes a first terminal and a second terminal. The first terminal of the sixth switch SW6 is coupled to the second terminal of the fly capacitor Cf2. The output capacitor Cout includes two terminals, one of which is coupled to the grounding terminal GND, and the other is coupled to the second terminal of the sixth switch SW6.

The pump unit 710 includes internal capacitors Cf1_1 through Cf1_M, in which M is a positive integer greater than 0, first internal switches ISW1_1 through ISW1_M, second internal switches ISW2_1 through ISW2_M, and third internal switches $S_1$ through $S_{M-1}$. Each of the internal capacitors Cf1_1 through Cf1_M, the first internal switches ISW1_1 through ISW1_M, the second internal switches ISW2_1 through ISW2_M, and the third internal switches $S_1$ through $S_{M-1}$ includes a first terminal and a second terminal. The pump unit 710 includes a first terminal T1, a second terminal T2, a third terminal T3, and a fourth terminal T4. The first terminal T1 of the pump unit 710 is coupled to an input voltage Vin, and the second terminal T2 of the pump unit 710 is coupled to a first voltage V1, i.e., a grounding voltage GND. The second terminal of the internal capacitor Cf1_1 is coupled to the third terminal T3 of the pump unit 710. The first terminal of the internal capacitor Cf1_M is coupled to the fourth terminal T4 of the pump unit 710. The first internal switches ISW1_1 through ISW1_M are respectively coupled between the first terminals of corresponding internal capacitors Cf1_1 through Cf1_M and the first terminal T1 of the pump unit 710. The second internal switches ISW2_1 through ISW2_M are respectively coupled between the second terminals of corresponding internal capacitors Cf1_1 through Cf1_M and the second terminal T2 of the pump unit 710.

The third internal switches $S_1$ through $S_{M-1}$ are coupled in a manner that the first terminal of the $i^{th}$ third internal switch $S_i$ is coupled to the first terminal of the $i^{th}$ internal capacitor Cf1_i, and the second terminal of the $i^{th}$ third internal switch $S_i$ is coupled to the second terminal of the i+1$^{th}$ internal capacitor Cf1_i+1, in which 0<i<M.

The structure and interrelationship between components of the charge pump circuit 700 are discussed in brief above. And below, the operation of the charge pump circuit 700 will be further illustrated in more detail. First, the charge pump circuit 500 enters a first period, in which a control signal PH1 is at a high level, and control signals PH2 and PH3 are at a low level. In this case, the first internal switches ISW1_1 through ISW1-M, the second internal switches ISW2_1 through ISW2-M, the third switch SW3, and the fourth switch SW4 are maintained on, while the first switch SW1, the second switch SW2, the fifth switch SW5, the sixth switch SW6, and the third internal switches $S_1$ through $S_{M-1}$ are maintained off. In such a way, the internal capacitors Cf1_1 through Cf1_M are connected in parallel and coupled between the first terminal T1 and the second terminal T2 of the pump unit 710. Meanwhile, the input voltage Vin and the first voltage V1, i.e., the grounding voltage GND, charge the internal capacitors Cf1_1 through Cf1_M connected in parallel until a voltage difference between the two terminals of the internal capacitors Cf1_1 through Cf1_M equals to the input voltage Vin.

Then the charge pump circuit 700 enters the second period, in which the control signal PH2 is at the high level, and the control signals PH1 and PH3 are at the low level. In this case, the first switch SW1, the second switch SW2, the third switch SW3, the fourth switch SW4, and the third internal switches $S_1$ through $S_{M-1}$ are maintained on, while the fifth switch SW5, the sixth switch SW6, the first internal switches ISW1_1 through ISW1-M, and the second internal switches ISW2_1 through ISW2-M are maintained off. In such a way, the internal capacitors Cf1_1 through Cf1_M are connected in series serving as an internal capacitor. A voltage basis terminal of the internal capacitor series, i.e., the second terminal of the internal capacitor Cf1_1, is coupled to the third terminal T3 of the pump unit 710. A voltage accumulating terminal of the internal capacitor series, i.e., the first terminal of the internal capacitor Cf1_M charges the fly capacitor Cf2 to (M+1)×Vin via the fourth terminal T4 of the pump unit 710 and the second switch SW2, and therefore provides a first output voltage VO1 with a voltage level of (M+1)×Vin.

Then the charge pump circuit 700 enters the third period, in which the control signal PH3 is at the high level, and the control signals PH1 and PH2 are at the low level. In this case, the first switch SW1, the second switch SW2, the fifth switch SW5, the sixth switch SW6, and the third internal switches $S_1$ through $S_{M-1}$ are maintained on, while the third switch SW3, the fourth switch SW4, the first internal switches ISW1_1 through ISW1-M, and the second internal switches ISW2_1 through ISW2-M are maintained off. Meanwhile, the first output voltage VO1 is maintained at the voltage level of (M+1)×Vin. On the other hand, the first terminal of the fly capacitor Cf2 is coupled to the fourth voltage V4, i.e., the grounding voltage GND, so as to discharge the output capacitor Cout via the sixth switch SW6, and thereby generate a second output voltage VO2 with a voltage level of −(M+1)×Vin. The aforementioned first period, second period, and third period are used for identifying the sequence of turning on the switches, without restricting the practical order of processing.

Those skilled in the art may vary the quantity of internal capacitors employed in the pump unit 710, i.e., selecting the value of M, so as to generate first output voltage VO1 and second output voltage VO2 with a corresponding multiplying factor. Further, the multiplying factor for voltage levels of the first output voltage VO1 and the second output voltage VO2 can also be adjusted by setting the first voltage V1, the second voltage V2, the third voltage V3, and the fourth voltage V4 with different voltage levels. For example, the second voltage V2 of the charge pump circuit 700 can be varied to the grounding voltage GND or other voltage level, so that the charge pump circuit 700 generates an M multiple of the output voltage plus V2 and a −M multiple of the output voltage minus V2.

Third Embodiment

Figure 8:
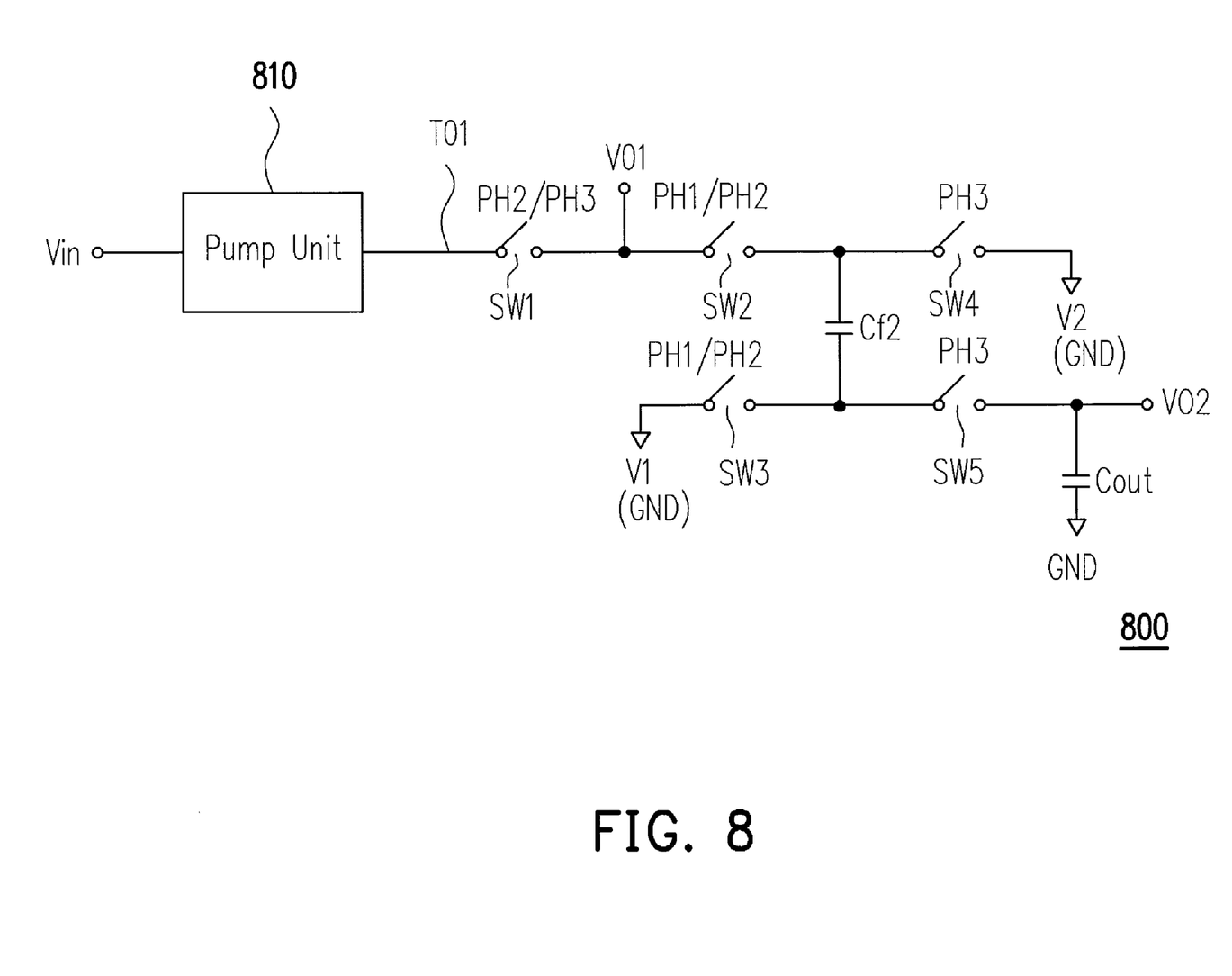
FIG. 8 is a circuit block diagram of a charge pump according to a third embodiment of the present invention.

FIG. 8 is a circuit block diagram of a charge pump according to a third embodiment of the present invention. Referring to FIG. 8, there is shown a charge pump circuit 800. The charge pump circuit 800 includes a pump unit 810, a first switch SW1, a second switch SW2, a third switch SW3, a fourth switch SW4, a fifth switch SW5, a fly capacitor Cf2, and an output capacitor Cout. The pump unit 810 includes an input terminal and an output terminal TO1. The input terminal of the pump unit 810 receives an input voltage Vin, and a first output voltage VO1 is provided from the output terminal TO1 of the pump unit 810.

The first switch SW1 includes a first terminal and a second terminal. The first terminal of the first switch SW1 is coupled to the output terminal TO1 of the pump unit 810. The second terminal of the first switch SW1 is coupled to the output terminal of the first output voltage VO1. The second switch SW2 includes a first terminal and a second terminal. The first terminal of the second switch SW2 is coupled to the second terminal of the first switch SW1. The third switch SW3 includes a first terminal and a second terminal. The first terminal of the third switch SW3 is coupled to a first voltage V1, e.g., grounding voltage GND. The fly capacitor Cf2 includes a first terminal and a second terminal. The fourth switch includes a first terminal and a second terminal. The first terminal of the fourth switch is couple to a second voltage V2, e.g., the grounding voltage GND. The first terminal of the fly capacitor Cf2 is coupled to the second terminal of the second switch SW2 and the second terminal of the fourth switch SW4. The second terminal of the fly capacitor Cf2 is coupled to the second terminal of the third switch SW3. The fifth switch SW5 includes a first terminal and a second terminal. The first terminal of the fifth switch SW5 is coupled to the second terminal of the fly capacitor Cf2. The output capacitor Cout includes two terminals, one of which is coupled to the grounding voltage GND, and the other is coupled to the second terminal of the fifth switch SW5 and an output terminal of the second output voltage VO2.

The structure and interrelationship between components of the charge pump circuit 800 are discussed in brief above. And below, the application of the pump unit 810 will be further illustrated in more detail.

Figure 9:
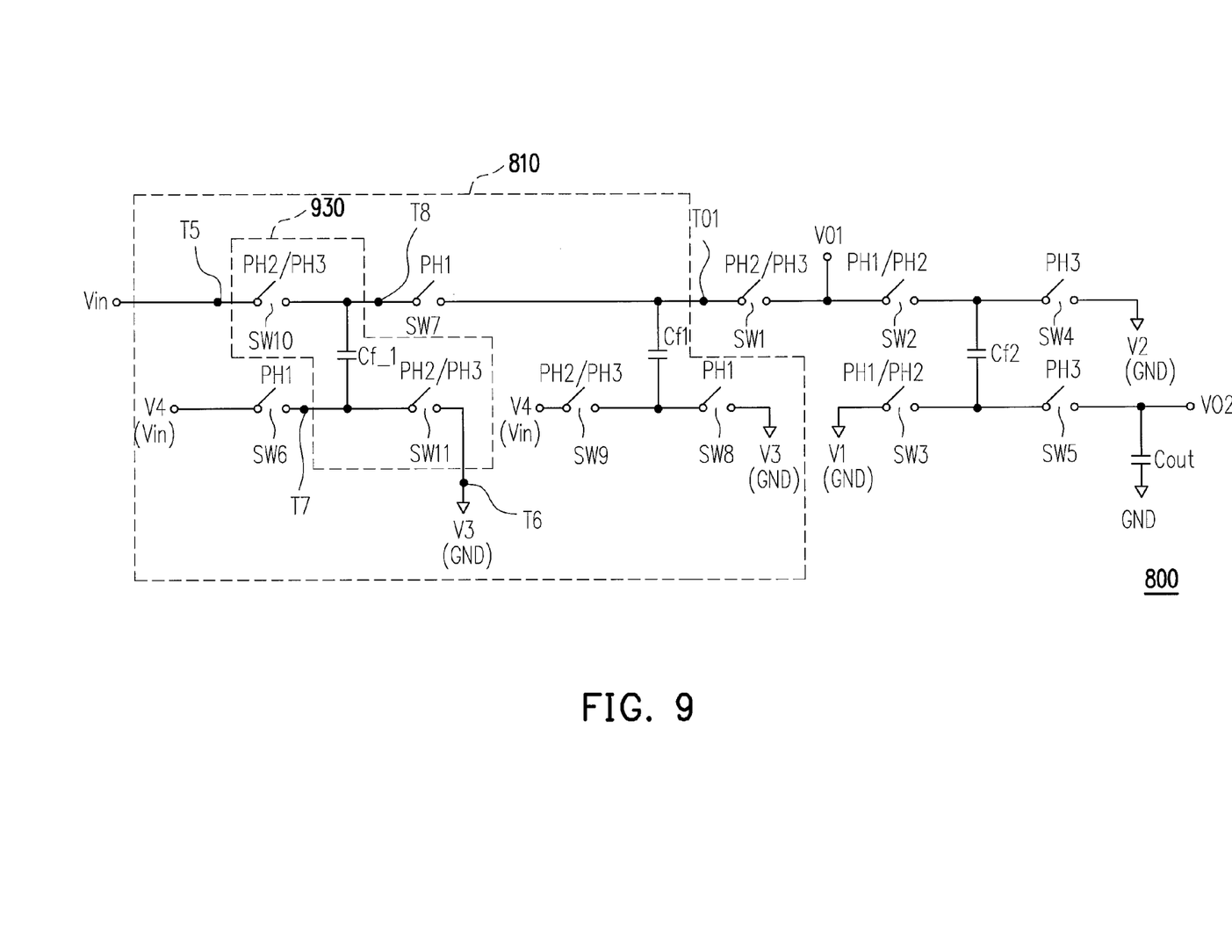
FIG. 9 is a circuit diagram of the charge pump of FIG. 8.

FIG. 9 is a circuit diagram of the charge pump of FIG. 8. Referring to FIG. 9, the pump unit 810 includes a first pump unit 930, a sixth switch SW6, a seventh switch SW7, an internal capacitor Cf1, an eighth switch SW8, and a ninth switch SW9. The first pump unit 930 includes a first terminal T5, a second terminal T6, a third terminal T7, and a fourth terminal T8. Each of the sixth switch SW6, the seventh switch SW7, the internal capacitor Cf1, the eighth switch SW8, and the ninth switch SW9 includes a first terminal and a second terminal. The first terminal T5 of the first pump unit 930 is coupled to the input voltage Vin. The second terminal T6 of the first pump unit 930 is coupled to a third voltage, e.g., grounding voltage GND. The first pump unit 930 further includes a first internal capacitor Cf_1, a tenth switch SW10, and an eleventh switch SW11. A terminal of the tenth switch SW10 serves as the first terminal T5 of the first pump unit 930, and another terminal of the tenth switch SW10 is coupled to a first terminal of the first internal capacitor Cf_1 which is served as the fourth terminal T8 of the first pump unit 930. A terminal of the eleventh switch SW11 is served as the second terminal T6 of the first pump unit 930, and another terminal of the eleventh switch SW11 is coupled to the second terminal of the first internal capacitor Cf_1 which is served as the third terminal T7 of the first pump unit 930.

The first terminal of the sixth switch SW6 is coupled to a fourth voltage, e.g., the input voltage Vin. The second terminal of the sixth voltage SW6 is coupled to the third terminal T7 of the first pump unit 930. The first terminal of the seventh switch SW7 is coupled to the fourth terminal T8 of the first pump unit 930. The first terminal of the internal capacitor Cf1 is coupled to the second terminal of the seventh switch SW7. The first terminal of the eighth switch SW8 is coupled to the second terminal of the internal capacitor Cf1, and the second terminal of the eighth switch SW8 is coupled to a third voltage V3, i.e., grounding voltage GND. The first terminal of the ninth switch SW9 is coupled to the second terminal of the internal capacitor Cf1, and the second terminal of the ninth switch SW9 is coupled to a fourth voltage V4, i.e., the input voltage Vin.

Figure 10A:
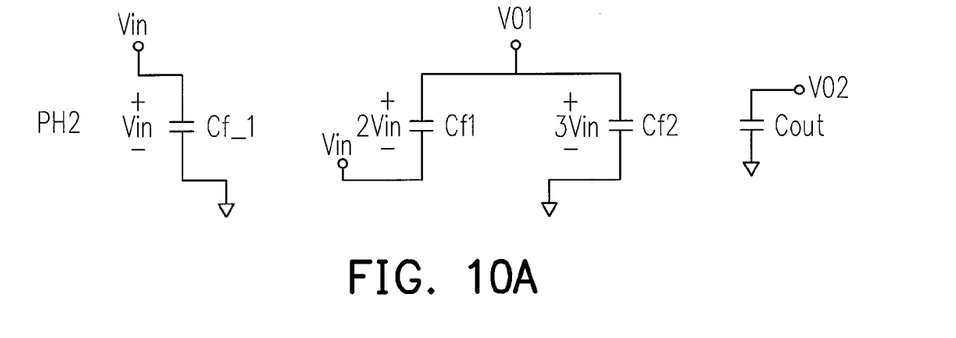
FIGS. 10A through 10C are equivalent circuits of the charge pump circuit shown in FIG. 9 during a first period through a third period, respectively.

The structure and interrelationship between components of the pump unit 810 are discussed in brief above. And below, the operation of the charge pump circuit 800 will be further illustrated in more details. First, when the charge pump circuit 800 enters a second period, a control signal PH2 is at a high level, and control signals PH1 and PH3 are at a low level. In this case, the first switch SW1, the second switch SW2, the third switch SW3, the ninth switch SW9, the tenth switch SW10, and the eleventh switch SW11 are maintained on, while the fourth switch SW4, the fifth switch SW5, the sixth switch SW6, the seventh switch SW7, and the eighth switch SW8 are maintained off, in which an equivalent circuit of the charge pump circuit 800 is shown in FIG. 10A. Meanwhile, the input voltage Vin and the third voltage V1, i.e., the grounding voltage GND, charge the first internal capacitor Cf_1 of the first pump unit 930, so as to obtain a voltage difference between the two terminals of the first internal capacitor Cf_1 equals to the input voltage Vin.

Figure 10B:
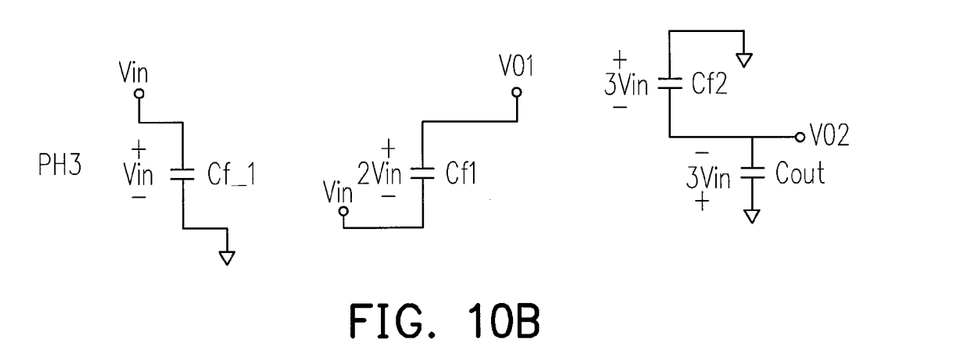

Then the charge pump circuit 800 enters the third period, in which the control signal PH3 is at the high level, and the control signals PH1 and PH2 are at the low level. In this case, the first switch SW1, the fourth switch SW4, the fifth switch SW5, the ninth switch SW9, the tenth switch SW10, and the eleventh switch SW11 are maintained on, while the second switch SW2, the third switch SW3, the sixth switch SW6, the seventh switch SW7, and the eighth switch SW8 are maintained off, in which in which an equivalent circuit of the charge pump circuit 800 is as shown in FIG. 10B. Meanwhile, the input voltage Vin and the third voltage V3, i.e., the grounding voltage GND, keeps charging the first internal capacitor Cf_1, and the voltage difference between two terminals of the first internal capacitor Cf_1 is maintained as Vin.

Figure 10C:
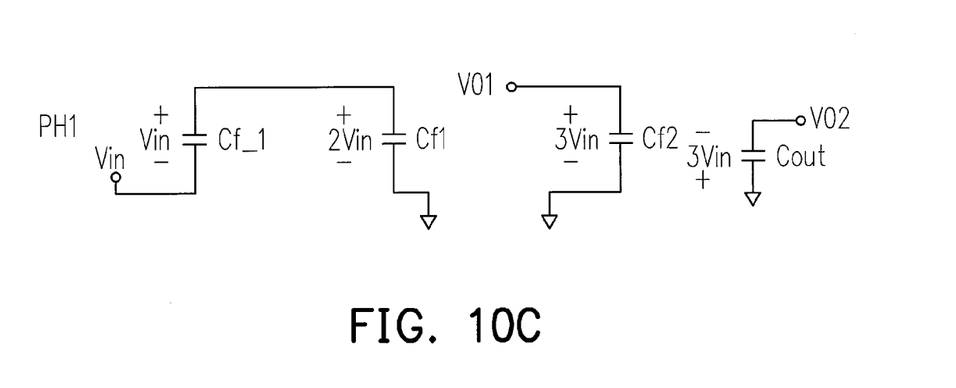

Then the charge pump circuit 800 enters the first period, in which the control signal PH1 is at the high level, and the control signals PH2 and PH3 are at the low level. In this case, the second switch SW2, the third switch SW3, the sixth switch SW6, the seventh switch SW7, and the eighth switch SW8 are maintained on, while the first switch SW1, the fourth switch SW4, the fifth switch SW5, the ninth switch SW9, the tenth switch SW10, and the eleventh switch SW11 are maintained off, in which an equivalent circuit of the charge pump circuit 800 is as shown in FIG. 10C. Meanwhile, the second terminal of the first internal capacitor Cf_1 is coupled to the fourth voltage V4, i.e., the input terminal Vin, so that the voltage level at the first terminal of the first internal capacitor Cf_1 rises from Vin to 2Vin, and charges the internal capacitor Cf1 of the pump unit 810 to 2Vin.

Then the charge pump circuit 800 enters the second period again, in which the second terminal of the internal capacitor Cf1 is coupled to the input voltage Vin, and the voltage level of the first terminal of the internal capacitor Cf1 rises from 2Vin to 3Vin. The internal capacitor Cf1 then charges the fly capacitor Cf2 to 3Vin, and generates the first output voltage VO1 with a voltage level of 3Vin.

Then the charge pump circuit 800 enters the third period again, in which the second terminal of the internal capacitor Cf1 is maintained coupled with the input voltage Vin, so that the first output voltage VO1 is maintained with the voltage level of 3Vin. On the other hand, the first terminal of the fly capacitor Cf2 is coupled to the grounding voltage GND, and thereby discharges the output capacitor Cout by the charges stored therein, and thus generating the second output voltage VO2 with a voltage level of −3Vin thereby.

In such a way, the charge pump circuit 800 repetitively passes through the foregoing three periods, and generates the first output voltage VO1 of 3Vin and the second output voltage VO2 of −3Vin. According to the current embodiment, the aforementioned first period, second period, and third period are used for identifying the sequence of turning on the switches, without restricting the practical order of processing.

Figure 11:
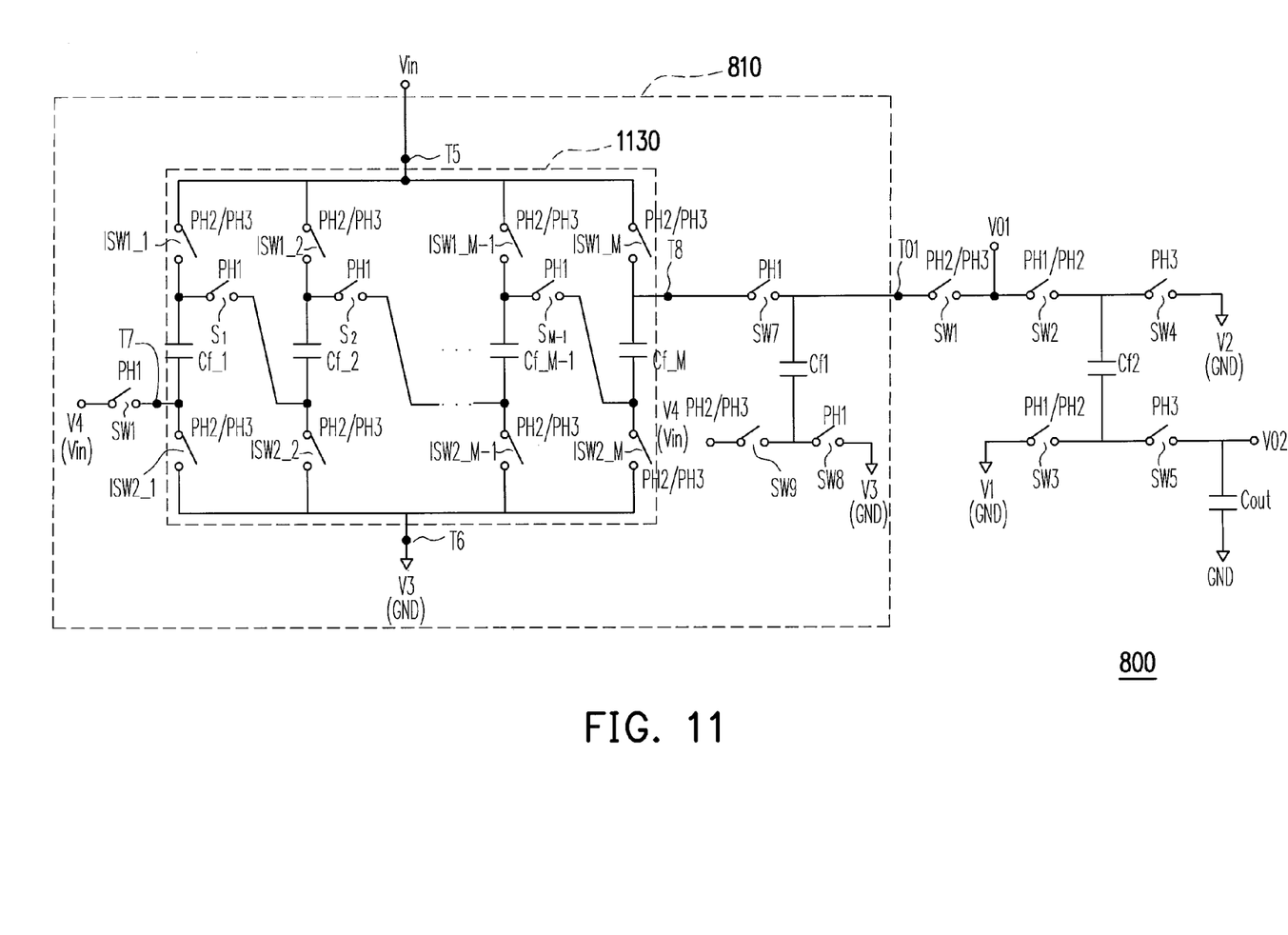
FIG. 11 is a circuit diagram of a charge pump according to an embodiment of the present invention.

Furthermore, the third embodiment may also be modified to provide the first output voltage VO1 and the second output voltage VO2 with other multiplying factors by replacing the internal circuit of the first pump unit 930 as shown in FIG. 9 with a circuit of a first pump unit 1130 as shown in FIG. 11. Those skilled in the art should be able to know the circuit as shown in FIG. 11 by referring to the foregoing embodiments illustrated above, and adaptively determine the quantity of the first internal capacitors used in the first pump unit 1130, i.e., the value of M, so as to obtain the first output voltage VO1 and the second output voltage VO2 of corresponding multiplying factors. The details are not to be iterated hereby.

Moreover, the internal circuit structure of the pump unit 810 is one of the embodiments, and should not be construed as a restriction of the present invention. Those skilled in the art having been taught by the above teachings should know how to obtain output voltages M×Vin and −M×Vin with other circuits capable of providing a multiple of input voltages for the pump unit 810 according to the current embodiment, and is not iterated hereby.

In summary, the present invention has the following advantages.
1. By employing a fly capacitor for stabilizing an output voltage under a certain control signal (in a certain period), comparatively a less number of capacitors may be employed for generating a maximum output voltage. Thus, the number of capacitors used therein may be reduced and the cost of fabricating the circuit may be reduced.
2. By using less number of control signals (periods), an imbalance between charging and discharging may be avoided so as to obtain a higher output voltage, and therefore a higher efficiency and a larger maximum load current may be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A charge pump circuit, for generating a first output voltage and a second output voltage according to an input voltage, comprising:
   a pump unit comprising at least an internal capacitor, a first terminal, a second terminal, a third terminal, and a fourth terminal, wherein the first terminal is coupled to the input voltage, the second terminal is coupled to a first voltage so as to charge the internal capacitor with the input voltage and the first voltage during a first period, and allow the internal capacitor to provide the first output voltage to the fourth terminal during a second period and a third period in accordance with a voltage level of the third terminal;
   a first switch, comprising a first terminal coupled to a second voltage, and a second terminal coupled to the third terminal of the pump unit, wherein the first switch is maintained off during the first period, and maintained on during the second period and the third period;
   a second switch, comprising a first terminal coupled to the fourth terminal of the pump unit, and a second terminal, wherein the second switch is maintained off during the first period, and maintained on during the second period and the third period;
   a third switch, comprising a first terminal coupled to the second terminal of the second switch, and a second terminal, wherein the third switch is maintained on during the first period and the second period, and maintained off during the third period, wherein the first terminal of the third switch is also coupled to the output terminal of the first output voltage;
   a fourth switch, comprising a first terminal coupled to a third voltage, and a second terminal, wherein the fourth switch is maintained on during the first period and the second period, and maintained off during the third period;
   a fifth switch, comprising a first terminal coupled to a fourth voltage, and a second terminal, wherein the fifth switch is maintained off during the first period and the second period, and maintained on during the third period;
   a fly capacitor, comprising a first terminal and a second terminal, wherein the first terminal of the fly capacitor is coupled to the second terminal of the third switch and the second switch of the fifth switch, the second terminal of the fly capacitor is coupled to the second terminal of the fourth switch, wherein the second terminal of the fly capacitor is coupled to the third voltage during the second period, for charging the fly capacitor with the first output voltage and the third voltage; the fly capacitor provides the second output voltage to the second terminal of the fly capacitor in accordance with a voltage level of the fourth voltage during the third period; and the second terminal of the fly capacitor is coupled to the third voltage, so as to provide the first output voltage to the first terminal of the fly capacitor during the first period in accordance with a voltage level of the third voltage; and
   a sixth switch, comprising a first terminal coupled to the second terminal of the fly capacitor, and a second terminal coupled to provide the second output voltage, wherein the sixth switch is maintained off during the first period and the second period, and maintained on during the third period.

2. The charge pump circuit according to claim 1, wherein the pump unit further comprises:
   a seventh switch comprising the first terminal of the pump unit, and another terminal coupled to a first terminal of the internal capacitor, wherein the first terminal of the internal capacitor serves as the fourth terminal of the pump unit; and
   an eighth switch comprising the second terminal of the pump unit, and another terminal coupled to a second terminal of the internal capacitor, wherein the second terminal of the internal capacitor serves as the third terminal of the pump unit.

3. The charge pump circuit according to claim 1, wherein the pump unit comprises:
   M internal capacitors, wherein M is a positive integer greater than 0,
   wherein during the first period, the internal capacitors are connected in parallel and coupled between the first terminal and the second terminal of the pump unit; during the second period and the third period, the internal capacitors are connected in series and configure an internal capacitor series having a voltage accumulating terminal coupled to the fourth terminal of the pump unit and a voltage basis terminal coupled to the third terminal of the pump unit.

4. The charge pump circuit according to claim 3, wherein the pump unit further comprises:

M first internal switches, respectively coupled between first terminals of the corresponding internal capacitors and the first terminal of the pump unit, for turning on to conduct therebetween during the first period;

M second internal switches, respectively coupled between second terminals of the corresponding internal capacitors and the second terminal of the pump unit, for turning on to conduct therebetween during the first period; and M−1 third internal switches, each having a first terminal and a second terminal, wherein the first terminal of an $i^{th}$ third internal switch is coupled to the first terminal of an $i^{th}$ internal capacitor, the second terminal of the $i^{th}$ third internal switch is coupled to the second terminal of the $i+1^{th}$ internal capacitor, for turning on to conduct therebetween during the second period and the third period so as to allow the internal capacitors to be serially connected and configure the internal capacitor series, wherein i is a positive integer, and 0<i<M.

5. The charge pump circuit according to claim 1 further comprises:
an output capacitor, comprising a first terminal coupled to a grounding terminal, and a second terminal coupled to the second terminal of the sixth switch.

6. The charge pump circuit according to claim 1, wherein the first voltage, the third voltage, and the fourth voltage are grounding voltages.

7. The charge pump circuit according to claim 1, wherein the second voltage is the input voltage.

8. A charge pump circuit, comprising:
a pump unit comprising an input terminal, and an output terminal, wherein the input terminal of the pump unit receives an input voltage, and the output terminal of the pump unit provides a first output voltage;
a first switch includes a first terminal and a second terminal, the first terminal of the first switch being coupled to the output terminal of the pump unit, wherein the first switch is maintained turning off during a first period, and maintained turning on during a second period and a third period, the second terminal of the first switch being coupled to provide the first output voltage;
a second switch comprising a first terminal and a second terminal, the first terminal of the second switch being coupled to the second terminal of the first switch, wherein the second switch is maintained on during the first period and the second period, and maintained off during the third period;
a third switch comprising a first terminal and a second terminal, the first terminal of the third switch being coupled to a first voltage, wherein the third switch is maintained on during the first period and the second period, and maintained off during the third period;
a fourth switch comprising a first terminal and a second terminal, the first terminal of the fourth switch being coupled to a second voltage, wherein the fourth switch is maintained off during the first period and the second period, and maintained on during the third period;
a fly capacitor comprising a first terminal and a second terminal, the first terminal of the fly capacitor being coupled to the second terminal of the second switch and the second terminal of the fourth switch, the second terminal of the fly capacitor being coupled to the second terminal of the third switch, wherein the second terminal of the fly capacitor is coupled to the first voltage during the second period for charging the fly capacitor with the first output voltage and the first voltage; during the third period, the fly capacitor provides a second output voltage to the second terminal of the fly capacitor in accordance with a voltage level of the second voltage; and the second terminal of the fly capacitor is coupled to the first voltage during the first period, so as to allow the fly capacitor to provide the first output voltage in accordance with a voltage level of the first voltage; and
a fifth switch comprising a first terminal and a second terminal, the first terminal of the fifth switch being coupled to the second terminal of the fly capacitor, wherein the fifth switch is maintained off during the first period and the second period, and maintained on during the third period, the second terminal of the fifth switch is coupled to provide the second output voltage.

9. The charge pump circuit according to claim 8, wherein the pump unit further comprises:
a first pump unit, comprising a first internal capacitor, a first terminal, a second terminal, a third terminal, and a fourth terminal, wherein the first terminal of the first pump unit is coupled to an input voltage, the second terminal of the first pump unit is coupled to a third voltage for charging the first internal capacitor with the input voltage and the third voltage during the second period and the third period, and allowing the first internal capacitor to provide an output voltage to the fourth terminal of the first pump unit in accordance with a voltage level of the third terminal of the first pump unit during the first period;
a sixth switch comprising a first terminal and a second terminal, the first terminal of the sixth switch being coupled to a fourth voltage, the second terminal of the sixth switch being coupled to the third terminal of the first pump unit, wherein the sixth switch is maintained on during the first period, and maintained off during the second period and the third period;
a seventh switch comprising a first terminal and a second terminal, the first terminal of the seventh switch being coupled to the fourth terminal of the first pump unit, wherein the seventh switch is maintained on during the first period, and maintained off during the second period and the third period;
an internal capacitor, comprising a first terminal and a second terminal, the first terminal of the internal capacitor being coupled to the second terminal of the seventh switch and the second terminal of the internal capacitor being coupled to the third voltage during the first period for charging the internal capacitor with the output voltage and the third voltage, wherein the internal capacitor provides the first output voltage to the output terminal of the pump unit in accordance with a voltage level of the second terminal of the internal capacitor during the second period and the third period;
an eighth switch comprising a first terminal and a second terminal, the first terminal of the eighth switch being coupled to the second terminal of the internal capacitor and the second terminal of the eighth switch being coupled to the third voltage, wherein the eighth switch is maintained on during the first period, and maintained off during the second period and the third period; and
a ninth switch comprising a first terminal and a second terminal, the first terminal of the ninth switch being coupled to the second terminal of the internal capacitor, the second terminal of the ninth switch being coupled to the fourth voltage, wherein the ninth switch is maintained off during the first period, and maintained on during the second period and the third period.

10. The charge pump circuit according to claim 9, wherein the third voltage is a grounding voltage.

11. The charge pump circuit according to claim 9, wherein the fourth voltage is the input voltage.

12. The charge pump circuit according to claim 9, wherein the first pump unit further comprises:
- a tenth switch, comprising the first terminal of the first pump unit, and another terminal coupled to the first terminal of the first internal capacitor, wherein the first terminal of the internal capacitor serves as the fourth terminal of the first pump unit; and
- an eleventh switch, comprising the second terminal of the first pump unit, and another terminal coupled to the second terminal of the first internal capacitor, wherein the second terminal of the first internal capacitor serves as the third terminal of the first pump unit.

13. The charge pump circuit according to claim 9, wherein the first pump unit comprises:
- M first internal capacitors, wherein M is a positive integer greater than 0,
- wherein during the second period and the third period, the first internal capacitors are connected in parallel and coupled between the first terminal and the second terminal of the first pump unit; and during the first period, the internal capacitors are connected in series and configure an internal capacitor series having a voltage accumulating terminal coupled to the fourth terminal of the pump unit and a voltage basis terminal coupled to the third terminal of the pump unit.

14. The charge pump circuit according to claim 13, wherein the pump unit further comprises:
- M first internal switches, respectively coupled between first terminals of the corresponding first internal capacitors and the first terminal of the pump unit, for turning on to conduct therebetween during the first period;
- M second internal switches, respectively coupled between second terminals of the corresponding first internal capacitors and the second terminal of the pump unit for turning on to conduct therebetween during the first period; and
- M−1 third internal switches, each having a first terminal and a second terminal, wherein the first terminal of an $i^{th}$ third internal switch is coupled to the first terminal of an $i^{th}$ first internal capacitor, the second terminal of the $i^{th}$ third internal switch is coupled to the second terminal of the $i+1^{th}$ first internal capacitor, for turning on to conduct therebetween during the second period and the third period so as to allow the first internal capacitors to be serially connected and configure the internal capacitor series, wherein i is a positive integer, and $0<i<M$.

* * * * *